(12) United States Patent
Lawrence

(10) Patent No.: US 6,304,009 B1
(45) Date of Patent: Oct. 16, 2001

(54) ROTOR ASSEMBLY AND METHOD OF MANUFACTURING

(75) Inventor: Robert Anthony Lawrence, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/576,737

(22) Filed: May 23, 2000

(51) Int. Cl.[7] .................................................. H02K 15/02
(52) U.S. Cl. .............................. 310/42; 29/598; 310/211; 310/261
(58) Field of Search ............................ 310/42, 261, 216, 310/211, 270; 29/598

(56) References Cited

U.S. PATENT DOCUMENTS

| | | | |
|---|---|---|---|
| 1,692,407 | * | 11/1928 | Hansen et al. ........................ 29/598 |
| 1,695,799 | * | 12/1928 | Daun ..................................... 29/598 |
| 1,695,884 | * | 12/1928 | Conant .................................. 29/598 |
| 1,931,153 | * | 10/1933 | Mueller ................................ 29/598 |
| 1,952,266 | * | 3/1934 | Leland et al. ......................... 29/598 |
| 2,125,970 | * | 8/1938 | Waters .................................. 29/598 |
| 3,683,493 | * | 8/1972 | Begovich .............................. 29/598 |
| 5,642,010 | * | 6/1997 | Carosa et al. ....................... 310/211 |

FOREIGN PATENT DOCUMENTS

| | | | |
|---|---|---|---|
| 10-32966 | * | 2/1998 | (JP) .............................. H02K/17/16 |
| 62-48242 | * | 2/1998 | (JP) .............................. H02K/17/16 |

* cited by examiner

Primary Examiner—Burton S. Mullins
(74) Attorney, Agent, or Firm—Margaret A. Dobrowitsky

(57) ABSTRACT

Described is a rotor assembly comprising:
  a circular iron core having a top and bottom side spaced from each other;
  extruded aluminum bars inserted into and around the circumference of the circular iron core; and
  a pair of extruded circular end rings attached to the top and bottom of the iron core and positioned.

A manufacturing process for manufacturing the rotor assembly is also described.

3 Claims, 3 Drawing Sheets

ROTOR ASSEMBLY AND METHOD OF MANUFACTURING

FIELD OF THE INVENTION

The present invention pertains to iron core rotors and extruded metallic components of the rotors.

BACKGROUND OF THE INVENTION

In the manufacturing of rotors, aluminum bars are extended, cut and installed into an iron core, which may consist of laminations of powder metal via slot openings. Aluminum end rings are machined from thick aluminum plate and positioned on each side of the iron core to mate with the extruded bars. Multiple passes of weld are required to attach the bars and end rings as well as to build up enough aluminum material to meet the end ring cross-sectional area requirement for the rotor without voids. The rough shaped welded end rings are then machined to the desired shape. This manufacturing process, particularly the welding, is very lengthy due to cooling time in between weld passes. In addition, machined end rings are very time consuming to manufacture and are expensive. Approximately 80–90% of the base material is scraped after machining. Post machining operations of the welded end rings are not desirable. It has been estimated that approximately 17% of additional aluminum is added during welding to allow for final machining which the material is lost as scrap.

With respect to the cast aluminum cage technique, the iron core is loaded into a casting die. A molten aluminum shot size is loaded into the die casting press. The bars and end rings are then cast. The cast rotor assembly is then cleaned and gates are removed. The iron core outer diameter is then machined to remove the aluminum flash created from the casting process. The manufacturing difficulties associated with this process includes high capital investment for casting equipment. Further casting porosity is generally a quality concern that is hard to control and identify in production. Additional iron core material is required on the outside diameter to allow for post machining of casting flash. Post machining operations, which are not desirable in general, are required to remove aluminum flash. If the process is subsequently out sourced to suppliers, finding good casting sources capable of casting the hybrid type rotor sizes is exceedingly difficult.

It is an object of the present invention to provide a manufacturing process utilizing extrusion capability for the shape of the iron rotor that is required. It is a further object of the present invention to provide a single weld pass to attach the bars and end rings to the iron core.

SUMMARY OF THE INVENTION

Described is a rotor assembly comprising:

a circular iron core lamination stack having a top and bottom side spaced from each other;

an extruded aluminum bar positioned around the circumference of the circular iron core; and a pair of extruded circular end rings attached to the top and bottom of the iron core and positioned thereto.

Also described is a method of manufacturing a rotor assembly comprising:

providing a circular iron core having a top and bottom side spaced from each other;

extruding aluminum bars, cutting them and installing them into the circumference of the iron rotor;

extruding end rings and forming them into a circle and placing them on the top and bottom portions of the iron rotor;

positioning the end rings to mate with the aluminum bars;

attaching the end rings and the aluminum bars together thereby forming the rotor assembly; and recovering the formed rotor assembly.

DESCRIPTION OF THE PREFERRED EMBODIMENT

Figure 1:
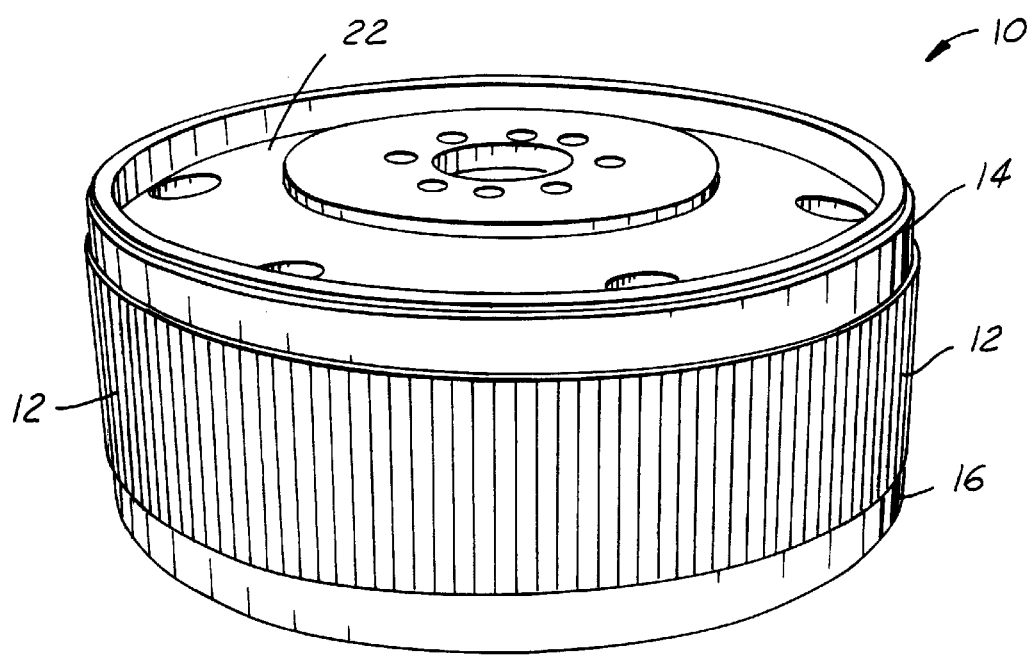
FIG. 1 is a prospective view of the rotor assembly having a hub as viewed from the engine side.

The present invention pertains to improved manufacturing process and ultimately improved iron core rotor. FIG. 1 is a complete assembly of the iron core rotor 10 of the present invention when viewed from the engine side. The rotor shows the aluminum bars 12, which are configured around the circumference of the iron core.

Figure 2:
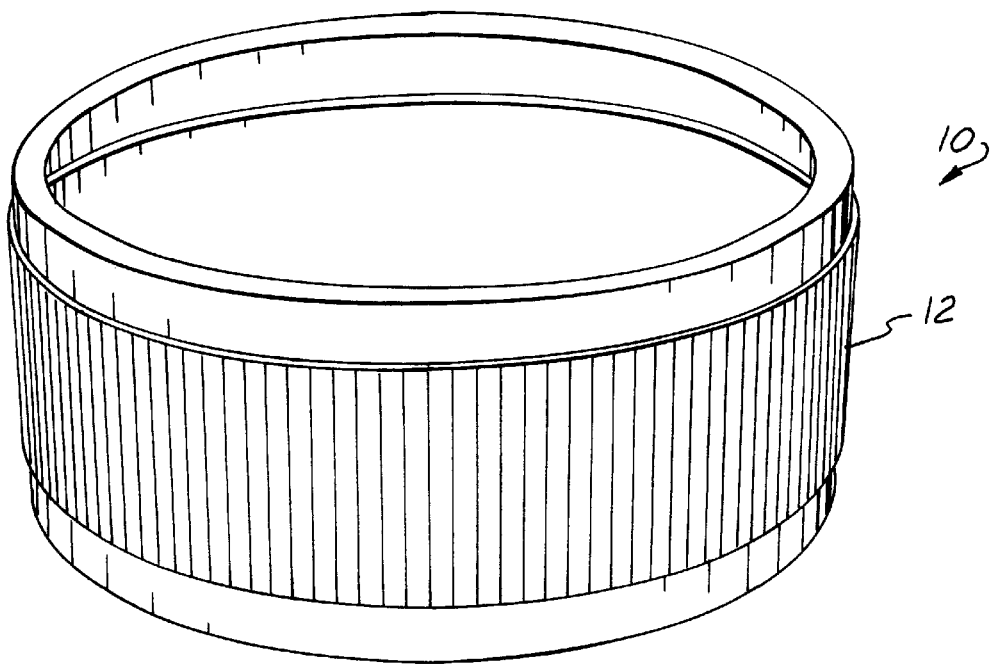
FIG. 2 is the rotor assembly of FIG. 1 when viewed from the opposite side, namely the transmission side.
Figure 3:
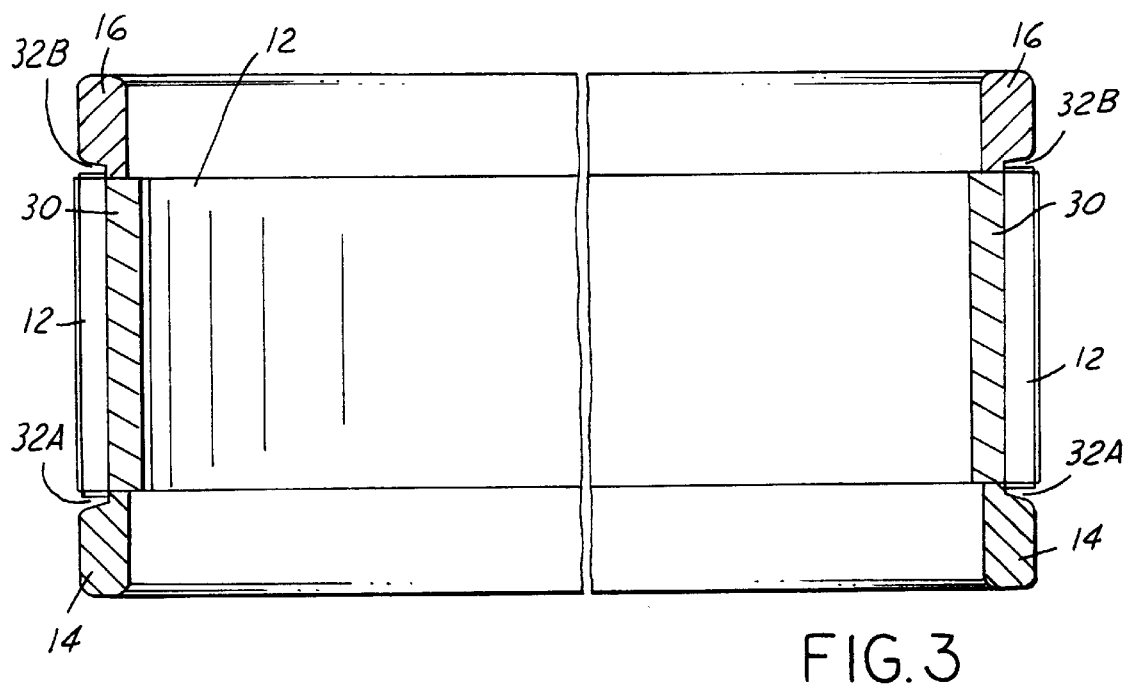
FIG. 3 is a cross-section of the iron rotor of the present invention.
Figure 6:
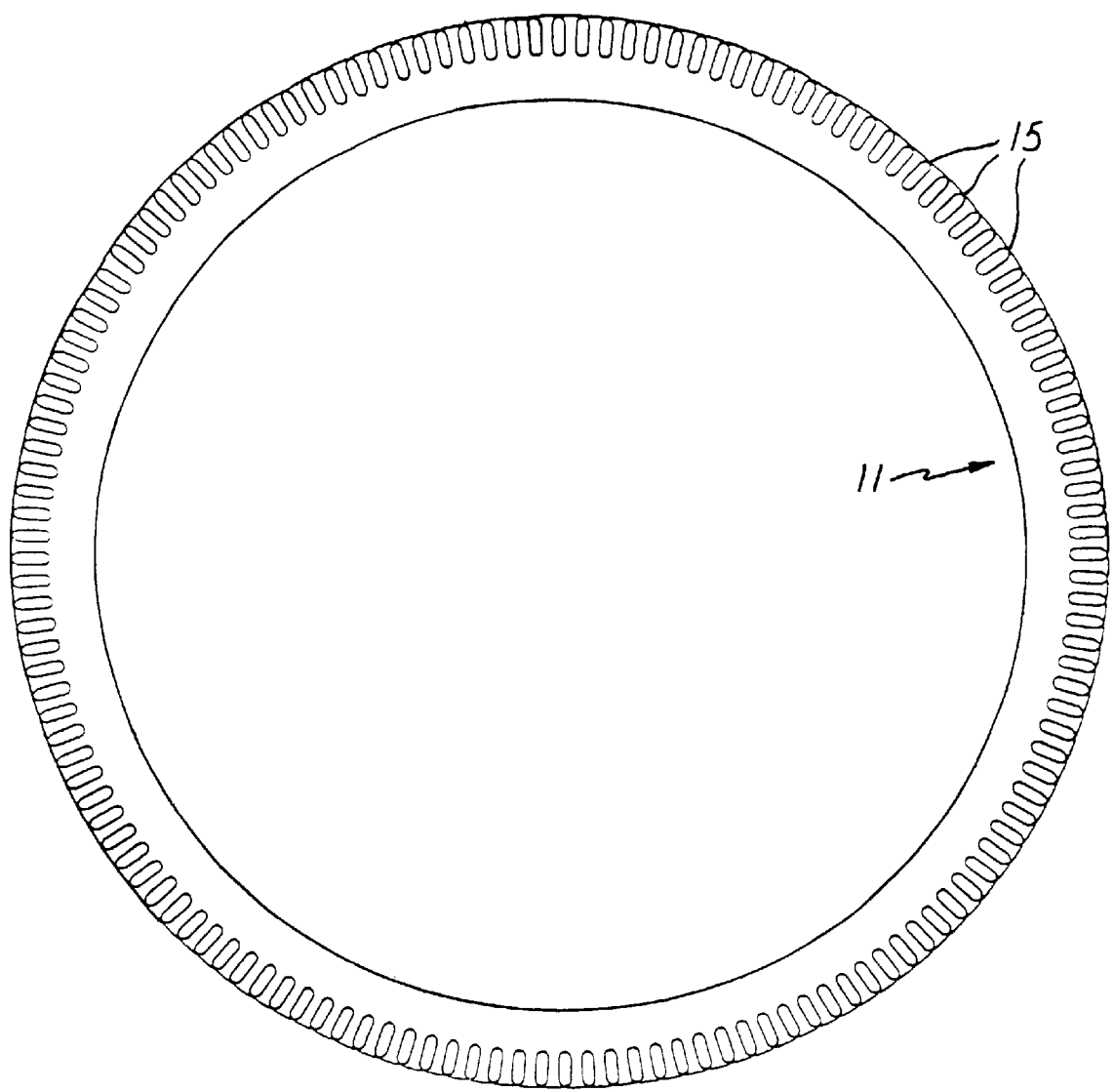
FIG. 6 is a top view of a singular circular rotor core lamination which may be built up to a desired size as shown in FIGS. 1–2.

It is to be appreciated that the iron core is manufactured in any of the normal well known techniques, such as the preparation of shaped laminations which are then built up to a desired height and circumference as shown in FIGS. 1–2. Powder metal technology may also be utilized to produce the desired iron rotor according to well known techniques. The end rings 14 and 16 are attached at the top (not shown) of the iron core and the bottom of the iron core. FIG. 2 shows the iron core assembly with the aluminum bars surrounding the circumference of the iron core when viewed from the transmission side 20. One side 22 of the rotor is the engine side. The extruded aluminum bar is positioned around the circumference of the circular iron core as is shown in FIGS. 1 and 2. FIG. 3 shows the lamination stack 30 with the aluminum bars 12 placed about the circumference of the lamination stack. The stamped holes (15) in the lamination (11) are where the aluminum bars are inserted (FIG. 6).

After the aluminum bars are inserted into the iron core, the end rings which are extruded are mated with the aluminum bars. Preferably a single pass weld is utilized at reference numeral 32A and 32B. The cross section of the iron core is shown in FIG. 3.

Figure 4:
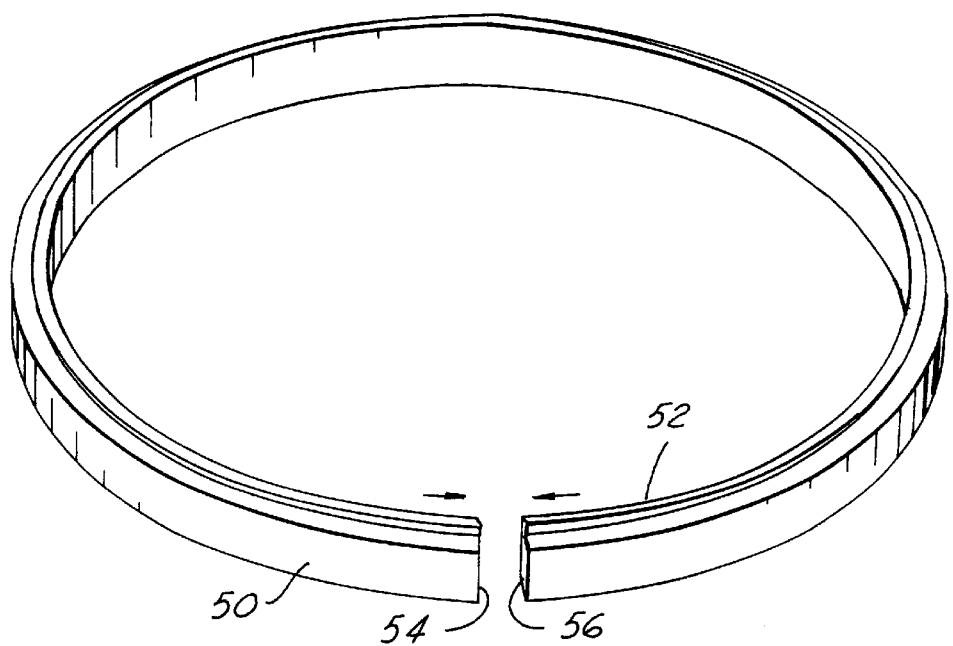
FIG. 4 is a perspective view of the rolled/formed end ring extrusion utilized in the present invention.
Figure 5:
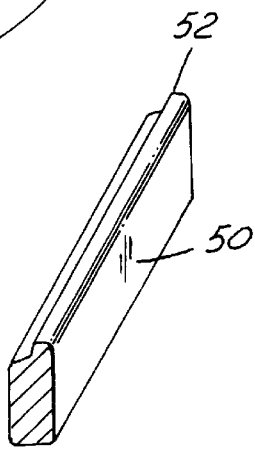
FIG. 5 is a side perspective view of the end ring extrusion, prior to circular forming, useful in present invention.

In the manufacturing of the end ring, it is extruded into a shape shown in FIG. 5 and then formed into the circular shape of FIG. 4. The extruded end ring 50 is comprised of lip member 52. The end ring can have its ends 54 and 56 attached using metal joining techniques known to the industry such as welded by a resistance welded joint using commercially available equipment readily available to perform that function. That end ring then takes the position as shown in FIGS. 1 and 2 as the top member 14 and bottom member 16 to mate with the aluminum bars.

The bars are attached to the endings using metal joining techniques known to the industry such as resistance or MIG welding.

As can be seen from the above and the attached drawings, the aluminum bars may be extruded for the shape desired and the end rings are likewise extruded preferably to a final shape. The end rings can be rolled to the roundness as shown in FIG. 4.

While the forms of the invention herein disclosed constitute presently preferred embodiments, many others are possible. It is not intended herein to mention all of the possible equivalent forms or ramifications of the invention; it is understood that the terms used herein are merely descriptive rather than limiting and that various changes may be made without departing from the spirit or scope of the invention.

What is claimed is:

1. A rotor assembly comprising:

a circular iron core lamination stack having a top and bottom side spaced from each other;

extruded aluminum bars which are inserted into and around the circumference of the circular iron core;

a pair of extruded circular end rings positioned at the top and bottom of the iron core and attached to the extruded aluminum bars;

whereby the end rings are cut to length and formed into the circle of desired shape.

2. A method of manufacturing a rotor assembly comprising:

providing a circular iron core lamination stack having a top and bottom side spaced from each other;

extruding aluminum bars, cutting them and installing them into the circumference of the iron rotor;

extruding end rings and forming them into a circle and placing them on the top and bottom portions of the iron core lamination stack;

positioning the end rings to mate with the aluminum bars; and attaching the end rings and the aluminum bars together thereby forming the rotor assembly.

3. The method of claim 2 further comprising cutting the end rings to length and then forming them into the circle of desired shape.

* * * * *